United States Patent [19]

Mueller et al.

[11] Patent Number: 5,061,784
[45] Date of Patent: Oct. 29, 1991

[54] POLYMERS PREPARED FROM 4,4'-BIS(3,4-DICARBOXYPHENYL) HEXAFLUOROISOPROPYL) DIPHENYL DIANHYDRIDE

[75] Inventors: Werner H. Mueller, Nucces City, Tex.; Rohitkumar H. Vora, Union City, N.J.

[73] Assignee: Hoechst Celanese Corp., Somerville, N.J.

[21] Appl. No.: 543,232

[22] Filed: Aug. 6, 1990

[51] Int. Cl.$^5$ ............................................. C08G 73/10
[52] U.S. Cl. .................................. 528/353; 528/363; 528/401; 528/486
[58] Field of Search ................. 528/353, 363, 401, 486

[56] References Cited

U.S. PATENT DOCUMENTS

| | | | |
|---|---|---|---|
| 3,649,601 | 3/1972 | Critchley et al. | 528/353 |
| 3,847,867 | 11/1974 | Heath et al. | 528/26 |
| 3,959,350 | 5/1976 | Rogers | 528/185 |
| 4,111,906 | 9/1978 | Jones et al. | 528/229 |
| 4,650,850 | 3/1987 | Howson | 528/26 |
| 4,734,464 | 3/1988 | Biensan | 525/420 |
| 4,925,915 | 5/1990 | Mueller et al. | 528/353 |
| 4,931,540 | 6/1990 | Mueller et al. | 528/353 |
| 4,933,132 | 6/1990 | Vora | 264/331.14 |
| 4,935,490 | 6/1990 | Hayes | 528/353 |
| 4,952,669 | 8/1990 | Vora | 528/353 |
| 4,954,609 | 9/1990 | Vora | 528/353 |
| 4,962,183 | 10/1990 | Chen, Sr. et al. | 528/342 |
| 4,973,651 | 11/1990 | Vora | 528/183 |
| 4,973,742 | 12/1990 | Vora et al. | 528/353 |
| 4,980,447 | 12/1990 | Khanna | 528/184 |

Primary Examiner—John Kight, III
Assistant Examiner—Sam A. Acquah
Attorney, Agent, or Firm—Joseph M. Mazzarese

[57] ABSTRACT

Polyimides and polyamide-acids having improved solubility and processing characteristics and high glass transition temperatures are provided, having incorporated into the polymeric chain the novel aromatic dianhydride compound 4,4'-bis[2-(3,4-dicarboxyphenyl) hexafluoroisopropyl] diphenyl dianhydride. The polyamide-acids and polyimides are prepared by reacting the 12F-Diphenyl DA with aromatic or aliphatic diamines. It has been found that the polyimides of this invention have improved solubility characteristics, good dielectric properties while at the same time exhibiting relatively high glass transition temperatures, and superior thermal and thermo-oxidative stability. The polymers may be processed into films, fibers or compression molded or fabricated into composites at moderate temperatures and pressures.

10 Claims, No Drawings

POLYMERS PREPARED FROM 4,4'-BIS(3,4-DICARBOXYPHENYL) HEXAFLUOROISOPROPYL) DIPHENYL DIANHYDRIDE

BACKGROUND OF THE INVENTION

The present invention is related to U.S. patent application Ser. No. 124,720, filed in the United States Patent and Trademark Office on Nov. 24, 1987, now U.S. Pat. No. 4,931,540.

1. Field of the Invention

This invention relates to new fluorine-containing polyimides and polyamide-acids which exhibit improved solubility in common organic solvents, low dielectric constants and relatively high glass transition temperatures.

2. Description of Related Art

Polyimides are widely used in the aerospace industry and electronics industry, because of their toughness, low density, thermal stability, radiation resistance and mechanical strength. However, it is recognized that polyimides are difficult to process. The processing problems arise from the insolubility of polyimides in most of the more common solvents Consequently, products have been fabricated from polyamide-acid intermediates, which are more soluble but less stable, and then imidized by the application of heat to provide the desired end product. The disadvantage of this process is that the water liberated during the imidization of the polyamide-acid forms undesirable voids or surface irregularities in the final product which reduces its mechanical properties.

It has been suggested that polyimides having a hexafluoroisopropylidene linking group in the diamine and/or dianhydride conmonomers have improved solubility properties. Several patents disclose polyimides prepared from diamines of this type. For example, U.S. Pat. No. 3,356,648 to Rogers discloses polyimides prepared from 2,2-bis(4-aminophenyl) hexafluoropropane; U.S. Pat. No. 4,592,925 to DuPont et al. discloses polyimides prepared from 2,2-bis(3-aminophenyl) hexafluoropropane; U.S. Pat. No. 4,111,906 to Jones et al. discloses polyimides prepared from 2,2-bis[4-(4-aminophenoxy)-phenyl] hexafluoropropane; and U.S. Pat. No. 4,477,648 to Jones et al. discloses polyimides prepared from 2,2-bis[(2-halo-4-aminophenoxy)phenyl] hexafluoropropane. In addition, U.S. Pat. No. 4,592,925 discloses polyimides prepared by reacting 2,2-bis(3-aminophenyl) hexafluoropropane and 4,4'-hexafluoroispropylidene bis (phthalic anhydride), also known as 2,2-bis(3,4-dicarboxyphenyl) hexafluoropropane dianhydride.

SUMMARY OF THE INVENTION

The present invention provides polyimides and polyamide-acids having improved solubility and processing characteristics and high glass transition temperatures, having incorporated into the polymeric chain the novel aromatic dianhydride compound 4,4'-bis[2-(3,4-dicarboxyphenyl) hexafluoroisopropyl] diphenyl dianhydride, hereinafter referred to as 12F-Diphenyl DA. The polyamide-acids and polyimides are prepared by reacting the 12F-Diphenyl DA with aromatic or aliphatic diamines. It has been found that the polyimides of this invention have improved solubility characteristics, good dielectric properties while at the same time exhibiting relatively high glass transition temperatures, and superior thermal and thermo-oxidative stability. The polymers may be processed into films, fibers or compression molded or fabricated into composites at moderate temperatures and pressures.

DETAILED DESCRIPTION OF THE INVENTION

The polyimides of this invention may be characterized as comprised of at least one recurring group having the structure:

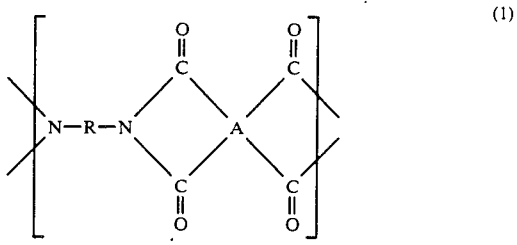

(1)

wherein R is a divalent aromatic or aliphatic organic radical and A is the imidized residuum of 4,4'-bis[2-(3,4-dicarboxyphenyl) hexafluoroisopropyl diphenyl dianhydride having the formula:

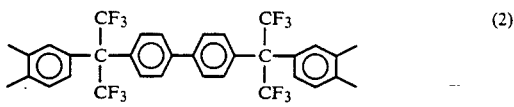

(2)

Preferably R in formula 1 comprises the imidized residuum of a phenylene, naphthalene or a bis-phenylene primary diamine, or a mixture of such diamines having the formula:

$$NH_2-R-NH_2 \quad (3)$$

all of which may be unsubstituted or ring substituted with halogen, hydroxy, lower $C_1$ to $C_6$ alkyl or lower $C_1$-$C_6$ alkoxy groups. Preferably the polymer has a molecular weight sufficient to provide an inherent viscosity of at least about 0.2 dl/g as measured from a solution of the polymer in dimethylacetamide at 25° C. at a polymer concentration of 0.5 weight percent.

Illustrative of aliphatic primary diamines which are suitable for use in the present invention are $C_2$ to $C_{30}$ alkylenes containing terminal amino groups.

Illustrative of aromatic primary diamines which are suitable for use in the present invention are:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;

bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2,2-bis[4-(4-aminophenoxy)phenyl] hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2trifluoroethane;
2-(3-aminophenyl)-2-(4-aminophenyl) hexafluoropropane.
1,4-bis(3-aminophenyl)buta-1-ene-3-yne;
1,3-bis(3-aminophenyl) hexafluoropropane;
1,5-bis(3-aminophenyl) decafluoropentane; and mixtures thereof.

Preferred polyimides are those prepared from 12F-Diphenyl DA or the tetracarboxylic acid analog and diaryl diamines such as 2,2-bis(4-aminophenyl) hexafluoropropane, 2,2-bis(3-aminophenyl) hexafluoropropane, 2,2-bis[4-(4-aminophenoxy)-phenyl] hexafluoropropane, bis(4-aminophenyl) ether, m-phenylene diamine, p-phenylene diamine, and mixtures thereof.

A mixture of two or more diamines may also be employed in the production of the polyimides of this invention. Where mixtures of two such diamines are present, they are preferably present at a molar ratio of from about 4 to 1 to about 1 to 4 based on the total moles of diamine present.

Polyimides of the present invention may also be prepared using a mixture of 12F-Diphenyl DA and one or more other aromatic dianhydrides.

Illustrative of dianhydrides which are suitable for use in mixtures with 12F-Diphenyl DA are:
1,2,4,5-benzene tetracarboxylic acid dianhydride;
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
3,3',4,4'-diphenyl tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
4,4'-bis(2,3-dicarboxyphenoxy) diphenyl ether dianhydride;
4,4'-bis(3,4-dicarboxyphenoxy) diphenyl ether dianhydride;
bis(3,4-dicarboxyphenyl) sulfide dianhydride;
4,4'-bis(2,3-dicarboxyphenoxy) diphenyl sulfide dianhydride;
4,4'-bis(3,4-dicarboxyphenoxy) diphenyl sulfide dianhydride;
bis(3,4-dicarboxyphenyl) sulfone dianhydride;
4,4'-bis(2,3-dicarboxyphenoxy) diphenyl sulfone dianhydride;
4,4'-bis(3,4-dicarboxyphenoxy) diphenyl sulfone dianhydride;
3,3',4,4'-benzophenone tetracarboxylic acid dianhydride;
2,2',3,3'-benzophenone tetracarboxylic acid dianhydride;
2,3,3'4'-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl] propane dianhydride;
2,2-bis[4-(3,4-dicarboxyphenoxy) phenyl] propane dianhydride;
4-(2,3-dicarboxyphenoxy)-4,-(3,4-dicarboxyphenoxy) diphenyl-2,2-propane dianhydride;
2,2-bis[4-(3,4-dicarboxyphenoxy-3,5-dimethyl) phenyl] propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,10-perylene tetracarboxylic acid dianhydride;

2,2-bis(3,4-dicarboxyphenyl) hexafluoropropane dianhydride;

1,3-bis(3,4-dicarboxyphenyl) hexafluoropropane dianhydride;

1,1-bis(3,4-dicarboxyphenyl)-1-phenyl-2,2,2-trifluoroethane dianhydride;

2,2-bis[4-(3,4-dicarboxyphenoxy) phenyl] hexafluoropropane dianhydride;

1,1-bis[4-(3,4-dicarboxyphenoxy) phenyl]-1-phenyl-2,2,2-trifluoroethane dianhydride; and mixtures thereof.

Where such dianhydride mixtures are employed, the molar ratio of 12F-Diphenyl DA and said one or more other dianhydrides is preferably within the range of about 4 to 1 to about 1 to 4 based on the total moles of dianhydride present.

One skilled in the art will recognize that the tetracarboxylic acids and acid-esters of the above-listed dianhydride compounds may also be used to produce the polyimides. These tetracarboxylic acids or derivatives thereof are available or may be prepared by known methods. For example, U.S. Pat. No. 3,847,867 to Heath et al. and U.S. Pat. No. 4,650,850 to Howson, which are incorporated herein by reference, show the preparation of bis(ether anhydrides) and bis(dialkyl aromatic ether anhydrides), respectively. The preparation of fluorine-containing dianhydrides is disclosed in U.S. Pat. No. 3,310,573 to Gordon and U.S. Pat. No. 3,649,601 to Critchley et al., which are also incorporated herein by reference.

A preferred process for preparing the polyimides of this invention involves first preparing a polyamide-acid by reacting the diamine and the tetracarboxylic acid or derivative such as the dianhydride in an organic solvent, preferably under substantially anhydrous conditions for a time and at a temperature sufficient to provide at least 50% of the corresponding polyamide-acid, and then converting the polyamide-acid to the polyimide. Suitable conditions for reacting the diamine and the dianhydride are disclosed in detail in U.S. Pat. Nos. 3,356,648 and 3,959,350, both to Rogers, which are incorporated herein by reference. The intermediate polyamide-acid may also be esterified to provide polyamide-esters.

In a preferred process for preparing the polyimides, the diamine and dianhydride may be reacted in N-methyl pyrrolidone, gamma-butyrolactone (BLO), or a mixture of BLO and another solvent such as diglyme. The resulting product is a polyamide-acid which is then converted to the desired polyimide by one of several methods: heating the polyamide-acid solution until imidization is substantially complete; or by combining the polyamide-acid solution and a dehydrating agent, such as a mixture of acetic anhydride and beta picoline with or without catalyst, and optionally heating the resulting mixture until imidization is substantially complete.

In the preferred embodiment of the invention, the diamine and the dianhydride components are reacted in approximately equi-molar amounts.

The following examples are illustrative of the invention.

EXAMPLE 1

Preparation of 4,4'-Bis-[2-(3,4-dimethylphenyl) hexafluoropropyl]- diphenyl and transformation to the corresponding tetracarboxylic dianhydride:

A 2 liter stainless steel autoclave was charged with 598 g 2-(3,4-dimethylphenyl) hexafluoropronanol-2, 154 g. Biphenyl and 720 g anhydrous hydrogen fluoride. The mixture was stirred for 70 hours at 150° C. Then the temperature was lowered to 80° C. and the HF was distilled off. The residue was dissolved in 500 ml of toluene and removed from the autoclave. The organic layer was washed several times with water and then dried over calcium chloride. After filtration the solvent was removed on the rotavap and the residue recrystallized from 1000 ml iso-propanol. The crystalline product was isolated by suction filtration. After drying in vacuo at 70° C., 385 g 4,4'-Bis[2-(3,4-dimethylphenyl) hexafluoroisopropyl] diphenyl, 58% of theoretical yield, m. p. 164°-65° C. were obtained as colorless crystals.

150 g of the above derivative were air-oxidized in a 1 liter autoclave at 180° C. in the liquid phase ($O_2$; acetic acid solvent, cobalt and manganese acetate catalyst). After filtration and partial removal of acetic acid and water, which is formed during the course of the reaction, the tetracarboxylic acid crystallized from the mother liquor. An excess of acetic anhydride was added and the solution refluxed for 4-5 hours. On cooling to room temperature the crystalline dianhydride precipitated and was isolated by suction filtration: yield 145.4 g (86%) colorless crystals of mp 276°-279C.

EXAMPLE 2

Preparation of a polyimide of 6F-44 Diamine and 12F-Diphenyl DA

To a 100 ml three necked flask fitted with a condenser, thermometer, stirrer and under nitrogen atmosphere, 1.67 grams (0.005 mole) of 2,2-bis(4-aminophenyl) hexafluoropropane (hereinafter 6F-44) were charged along with 10 grams of distilled N-methyl pyrrolidone (NMP). The mixture was stirred until a clear solution was obtained. To this clear, pale yellow colored solution was added 3.73 grams (0.005 mole) of 4,4'-bis[2-(3,4dicarboxyphenyl) hexafluoroisopropyl] diphenyl dianhydride (hereinafter 12F-Diphenyl DA) while stirring was continued. 11.6 grams of NMP was then added to the reaction mixture and agitation at room temperature was continued overnight for a period of about 16 hours. The resulting polyamide-acid (polyamic acid) had an inherent viscosity of 0.50 dl/g, measured at 0.5 g/dl at 25° C. in dimethyl acetamide.

The polyamide-acid was imidized as follows: 5.56 grams of acetic anhydride and 0.6 grams of beta-picoline were added to a portion of the polyamide-acid solution prepared above. The reaction mixture was stirred overnight for about 22 hours at room temperature and the resulting polyimide was precipitated in methanol, washed with fresh methanol and dried overnight for 8 hours in a vacuum oven at 60° C. The inherent viscosity of the polyimide was 0.43 dl/g, measured in a 0.5 g/dl solution in dimethyl acetamide at 25° C. The polymer was found to be soluble in NMP, tetrahydrofuran, acetone, MEK, diglyme, DMAC, chloroform and BLO solvents.

A polyimide film was prepared from the pre-imidized polyamic acid solution prepared above by spreading the solution on a glass plate and heating it in an oven at 190° C. for 1 hour. A very pale yellow, somewhat brittle, self-supporting, tough film was obtained.

EXAMPLES 3-4

Polyimides were prepared in accordance with the procedure set forth in Example 2 by reacting the 12F-Diphenyl DA with equi-molar quantities of the following diamines:

EXAMPLE 3: Meta-phenylenediamine (mPDA)
EXAMPLE 4: Para-phenylenediamine (pPDA)

The inherent viscosity of each of the polyamide-acids (PA) produced in Examples 2-4 is reported in Table 1. Also reported are the glass transition temperatures (Tg° C.) of the polyimides as measured by differential scanning calorimetry and the TGA temperature of the polyimides in degrees centigrade at which a 5% weight loss in air is encountered, measured by thermo gravametric analysis. The weight average (Mw) and number average (Mn) molecular weights of each polyimide are also reported, as well as the dispersity factor (d) which approximates the Mw divided by the Mn.

TABLE 1

| Example | Diamine | Inherent Viscosity dl/gm PA | GPC Mw | GPC Mn | d | DSC Tg °C. | TGA 5% wt. loss at °C. |
|---|---|---|---|---|---|---|---|
| 2 | 4,4'-6F Diamine | 0.50 | 49350 | 26797 | 1.8 | 293 | 530 |
| 3 | mPDA | 0.21 | 63265 | 16237 | 3.9 | 289 | 525 |
| 4 | pPDA | 0.18 | 41763 | 19601 | 2.1 | 310 | 525 |

Each of the films produced in Examples 2-4 were clear and somewhat brittle.

The polyimides exhibit good solubility properties in solvents such as N-methyl pyrrolidone (NMP), dimethyl acetamide (DMAc), diglyme, methylethylketone (MEK), tetrahydrofuran (THF), acetone, chloroform, butyrolactone (BLO), dimethylsulfoxide (DMS), dimethylformamide (DMF), propylene glycol methyl ether (PGME) and the like.

The polyimides also exhibit improved thermal flow properties and may be melt spun to form fibers and filaments. Because of their good solubility in common organic solvents, films may be cast from solvent solutions. Such films may be used as printed circuit backings, insulating dielectric interlayers and other applications where tough, high temperature stable films having good dielectric properties have been used in the past.

The polyimides of this invention may be molded using standard techniques such as compression molding or injection molding to produce melt fabricated articles such as safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded with fibers such as glass, graphite or boron fibers to produce molding compounds for high strength structural components such as jet engine components.

The polyimides may also be compounded with friction materials to produce molding compounds for high temperature braking components or with abrasive materials such as diamonds for high speed grinding wheels.

The polyimides may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

The polyimides may also be used to produce high temperature adhesives for bonding aerospace structures or electrical circuitry, conductive adhesives when mixed with conductive fillers such as silver or gold for microelectronic applications, or adhesives for glass, metal or plastic substrates.

They may be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

In general, the polyimides and polyamide-acid precursors of this invention may be used in all applications as disclosed in copending application Ser. No. 124,720, filed in the U.S. Patent and Trademark Office on Nov. 24, 1987, the disclosure of which application is incorporated herein by reference.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What we claim is:

1. A polyimide polymer comprising recurring groups having the structure:

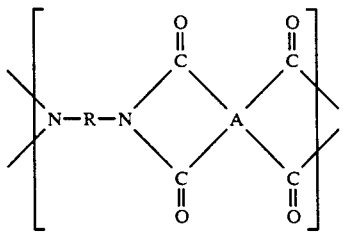

wherein R is a divalent aliphatic or aromatic organic radical and A is the residuum having the formula:

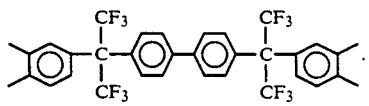

2. The polymer of claim 1 wherein R is selected from the group consisting of phenylene, naphthalene, a bisphenylene compound and mixtures thereof, which may be unsubstituted or ring substituted with a radical selected from the group consisting of halogen, hydroxy, lower $C_1$ to $C_6$ alkyl and lower $C_1$ to $C_6$ alkoxy.

3. The polymer of claim 1 having an inherent viscosity of at least about 0.2 dl/g as measured from a solution of the polymer in dimethylacetamide at 25° C. at a polymer concentration of 0.5 weight percent.

4. The polymer of claim 1 prepared by forming the amide-acid condensation product of 4,4'-bis[2-(3,4-dicarboxyphenyl) hexafluoroisopropyl] diphenyl dianhydride with one or more aromatic diamines and imidizing said amide-acid condensation product.

5. The polymer of claim 4 wherein said aromatic diamine is a diaryl diamine selected from the group consisting of 2,2-bis(4-aminophenyl) hexafluoropropane, 2,2-bis(3-aminophenyl) hexafluoropropane, 2,2-bis[4-(4-aminophenoxy)-phenyl] hexafluoropropane, bis(4-aminophenyl) ether, 2-(3-aminophenyl)-2-(4-aminophenyl) hexafluoropropane, m-phenylene diamine, p-phenylene diamine, and mixtures thereof.

6. The polymer of claim 5 having an inherent viscosity of at least about 0.2 dl/g as measured from a solution of the polymer in dimethylacetamide at 25° C. at a polymer concentration of 0.5 weight percent.

7. The polymer of claim 6 wherein said diamine is 2,2-bis(4-aminophenyl) hexafluoropropane.

8. The polymer of claim 6 wherein said diamine is 2,2-bis(3-aminophenyl) hexafluoropropane.

9. The polymer of claim 6 wherein said diamine is meta-phenylene diamine.

10. The polymer of claim 6 wherein said diamine is para-phenylene diamine.

* * * * *